United States Patent

Natsume

Patent Number: 4,941,769
Date of Patent: Jul. 17, 1990

[54] STRUCTURE FOR FASTENING A RESIN MEMBER WITH A THREADED BOLT

[75] Inventor: Yoshihisa Natsume, Shizuoka, Japan

[73] Assignee: Yazaki Corporation, Japan

[21] Appl. No.: 333,001

[22] Filed: Apr. 4, 1989

[30] Foreign Application Priority Data

Apr. 5, 1988 [JP] Japan .............. 63-45250[U]

[51] Int. Cl.⁵ ............................................ F16B 17/00
[52] U.S. Cl. .................... 403/408.1; 403/377; 403/388; 411/260; 411/903
[58] Field of Search ........... 403/162, 227, 388, 408.1, 403/150, 377; 411/260, 903, 909

[56] References Cited

U.S. PATENT DOCUMENTS

| | | | |
|---|---|---|---|
| 2,938,405 | 5/1960 | West | 403/388 X |
| 3,618,443 | 11/1971 | Fitzner | 403/388 X |
| 3,835,615 | 9/1974 | King, Jr. | 403/408.1 |
| 4,184,785 | 1/1980 | Marjollet et al. | 403/388 X |

FOREIGN PATENT DOCUMENTS

| | | | |
|---|---|---|---|
| 495478 | 11/1950 | Belgium | 403/408 |
| 2993480 | 10/1980 | Fed. Rep. of Germany | 403/408 |

56-136427 12/1981 Japan .

Primary Examiner—Andrew V. Kundrat
Assistant Examiner—Franco S. DeLiguori
Attorney, Agent, or Firm—Wigman & Cohen

[57] ABSTRACT

A structure for fastening a resin member to a base member typically composed of a metallic material with a threaded bolt passed through holes provided in the resin member and the base member, comprising a metallic sleeve through which the bolt is passed fitted in the hole of the resin member, the length of the sleeve being slightly shorter than that of the hole of the resin member. Therefore, when the threaded bolt is tightened, the inner circumferential wall of the hole of the resin member collapses upon a longitudinal end of the sleeve so that the threaded bolt may be securely tightened without damaging the resin member because the metallic sleeve bears a substantial amount of the stress produced by the fastening of the threaded bolt. Further, intervention of the part of the inner circumferential wall of the hole of the resin material between the longitudinal end of the sleeve and the head of the threaded bolt or a washer thereof prevents metal-to-metal contact therebetween, and produces a vibration insulating effect.

10 Claims, 3 Drawing Sheets

STRUCTURE FOR FASTENING A RESIN MEMBER WITH A THREADED BOLT

FIELD OF THE INVENTION

The present invention relates to a structure for fastening a resin member to a base member typically made of metallic material with a threaded bolt, in particular to such a structure which can securely fix a resin member of another member without producing any play therebetween of causing any damage to the resin member.

BACKGROUND OF THE INVENTION

Conventionally, when mounting a resin casing on a base member such as a metallic bracket using threaded bolts, a plurality of tabs each having a hole are typically provided along the outer periphery of the resin casing, so that threaded bolts may be passed through these holes of the tabs and threaded with the corresponding threaded holes provided in the bracket for the purpose of mounting the resin casing on the bracket.

However, when threaded bolts are used, a certain fastening force is required in order to ensure the necessary security of attachment of the resin casing to the case member, but applying excessive force to the threaded bolts may cause damage to the resin case. Namely, there may be a case that the resin case is cracked or deformed by the excessive force.

In order to overcome such problems of the prior art, it was proposed in Japanese Utility Model Laid Open publication No. 56-136427 to absorb excessive fastening force by placing a buffer ring through which the threaded bolt is passed between the tab and the bracket. The buffer ring will be deformed or axially compressed when stress is applied thereto, whereby it was possible to conveniently absorb any excessive fastening force applied by the fastening of the threaded bolt.

However, according to such a structure, it was necessary for the buffer ring to be mounted on the year surface of the part to be mounted in alignment with the hole for passing the threaded bolt. Further, when the buffer ring is not in advance mounted on the rear surface, it was necessary for the buffer ring to be fitted to the stem portion of the threaded bolt which is passed through the hole of the tab. However, such processes are not always possible due to possible poor accessibility and other reasons. Furthermore, even when such a buffer ring is used, if the fastening force is excessive and the buffer ring is deformed beyond its elastic limit, damage may still be caused to the part of the resin member surrounding the hole of the tab for passing a threaded bolt.

SUMMARY OF THE INVENTION

In view of such problems of the prior art, a primary object of the present invention is to provide a structure for fastening a resin member with a threaded bolt passed through a hole provided in the resin member, which permits secure fastening of the threaded bolt without damaging the resin member.

Another object of the present invention is to provide such a structure which is free from play between the threaded bolt and the resin member.

Still another object of the present invention is to provide such a structure which permits a temporary engagement of a threaded bolt in the hole for better efficiency of assembly work.

Still another object of the present invention is to provide such a structure which is easy and economical to implement.

These objects of the present invention will be accomplished by providing a structure for fastening a resin member to another member with a threaded bolt which is passed through holes provided in the members, comprising: a metallic sleeve to be fitted into said hole provided in said resin member; and the sleeve having the length which is slightly shorter than that of the hole of the resin member.

Thus, by tightening the threaded bolt, the part of the inner surface of the hole in the resin member which is exposed but is not covered by the sleeve deforms and fills the space formed above the longitudinal end of the sleeve, and this part serves as a buffer, through its elastic, viscoelastic or other material properties thereof, for absorbing the force applied by the tightening of the threaded bolt. However, since the sleeve covers most of the inner circumferential surface of the hole, the deformation of the resin member is limited to the above mentioned area, and full-scale collapsing of the hole would not occur. On the other hand, since the metallic sleeve bears a considerable part of the load produced by the tightening of the threaded bolt, a substantial fastening force may be applied thereto, thereby ensuring the security of the attachment of the resin member to the metallic base member.

Furthermore, the part of the resin member serving as a buffer prevents a metal-to-metal contact between the threaded bolt and the sleeve, a damping effect is produced, and generation of noise caused by vibration may also be prevented.

Preferably, the metallic sleeve is provided with engagement means for keeping the metallic sleeve in place, and the engagement means may comprise a plurality of projections or ribs provided on the outer circumferential surface of the sleeve, tangs radially extending from a longitudinal end of the sleeve, a slit extending at least substantially entire longitudinal length of the sleeve, or a plurality of elastic legs provided in the sleeve.

According to a preferred embodiment of the present invention, the sleeve is provided with notches through which projections formed on the inner circumferential wall of the hole of the resin material project, respectively, into a space defined by the inner circumferential surface of the sleeve. This facilitates the assembly work because the threaded bolts may be held in the corresponding holes before tightening them due to the engagement between the bolt and the projections.

BRIEF DESCRIPTION OF THE DRAWINGS

Now the present invention is described in the following with reference of the appended drawings, in which.

DETAILED DESCRIPTION OF THE PREFERRED EMBODIMENTS

Figure 1:
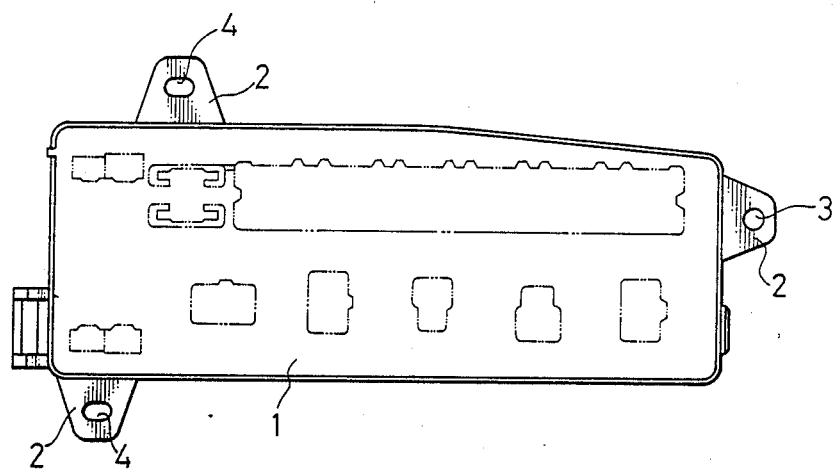
FIG. 1 is a plan view showing an electric junction box consisting of a case main body made of resin material to which the present invention is applied.

FIG. 1 shows an electric junction box to which the present invention is applied, and this junction box comprises a case main body 1 consisting of molded plastic material, and three tabs 2 integrally extending laterally therefrom. Each tab 2 has a specified thickness, and is provided with a mounting hole 3 or 4. As shown in FIG. 1, one of the holes 3 is round but the other two holes 4 are elongated so as to be able to correct a certain tolerance in dimensional precision.

Figure 2:
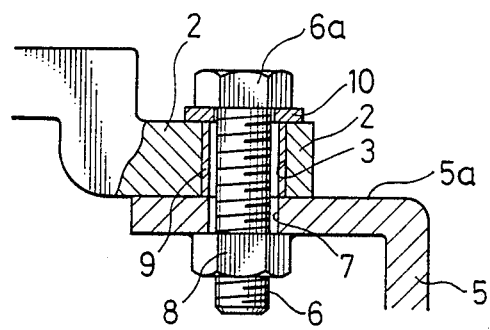
FIG. 2 is an enlarged sectional view of a first embodiment of the threaded bolt fastening structure according to the present invention.
Figure 5:
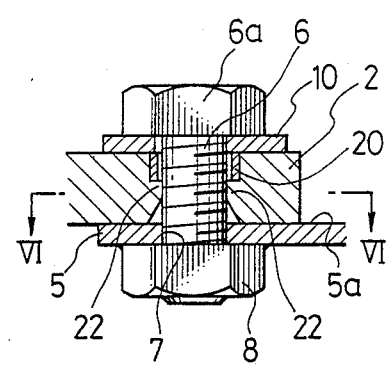
FIG. 5 is a sectional view similar to FIG. 2 showing a second embodiment of the present invention which is applied to an elongated hole of the resin member of the case main body.

The tabs 2 are placed on mounting surfaces 5a such as those of L-shaped brackets 5 or the like, for instance, mounted on a vehicle body as shown in FIGS. 2 and 5. These tabs 2 are securely attached to the brackets 5 by way of threaded bolts 6 which are passed through the holes 3 and 4 of the tabs 2 and corresponding holes 7 provided in the brackets 5. Each of the threaded bolts 6 is threaded with a nut 8 which will be welded to the rear surfaces of the brackets 5 after fastening the nut 8.

Figure 3A:
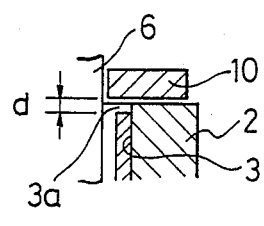
FIGS. 3(a) and 3(b) show a main part of FIG. 2 in a magnified scale, which show conditions before and after fastening the threaded bolt, respectively.

A cylindrical metallic sleeve 9 is fitted into the hole 3 as shown in FIG. 2. As shown in FIG. 3(a), the length of the sleeve 9 is shorter than the length of the hole 3 or the thickness of the tab 2 to the extent of the distance "d". Therefore, when a washer 10 is placed upon the tab 2 and the threaded bolt 6 is passed through the hole 3 without being tightened, there is a gap 3a between the lower surface of the washer 10 and the upper end of the sleeve 3 as shown in FIG. 3(a).

Figure 3B:
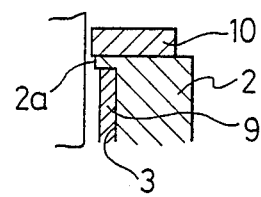

However, when the threaded bolt 6 is threaded with the nut 8 and tightening force is applied from a bolt head 6a of the bolt 6 to the washer 10, the part of the tab 2 immediately under the washer 10 is compressed and deformed, whereby the part of the tab 2 fills the gap 3a as denoted by numeral 2a in FIG. 3(b). This intervening part 2a therefore supports a substantial part of the load applied by the fastening of the bolt 6.

Thus, the metallic sleeve 9 prevents the collapsing of the hole 3 except for the controlled collapsing of the wall of the hole in the part adjoining the gap 3a, and serves as a reinforcement member for the hole 3 and the tab 2. Also, since the metallic sleeve 9 has a larger load bearing capacity than the surrounding part of the tab 2 which is made of resin material, the fastening force of the threaded bolt can be increased, so that a strong attachment of the tab 2 to the bracket 5 is made possible. Furthermore, since the intervening part 2a avoids the metal-to-metal contact between the washer 10 or the bolt 6 and the metallic sleeve 3, vibrations may be prevented from being directly transmitted from the bracket 5 to the case main body 1.

Figure 4:
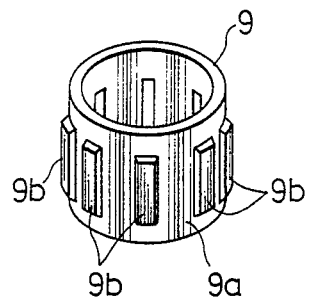
FIG. 4 is a perspective view showing an embodiment of the metallic sleeve according to the present invention.

FIG. 4 shows the metallic sleeve 9 in greater detail, and this metallic sleeve is provided with a plurality of longitudinal ribs 9b on its outer circumferential surface 9a by embossing or other press forming process. These longitudinal ribs 9b permit favorable press fitting of the sleeve 9 into the hole 3 through their own elasticity and/or through the elastic property of the material of the tab 2 itself which is enhanced by the localized pressure applied by these ribs 9b.

Figure 6:
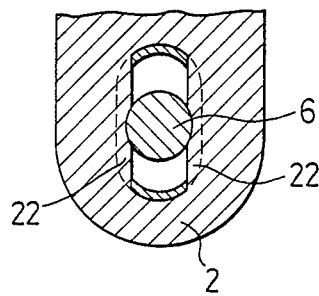
FIG. 6 is a sectional view taken along line VI—VI of FIG. 6.
Figure 7:
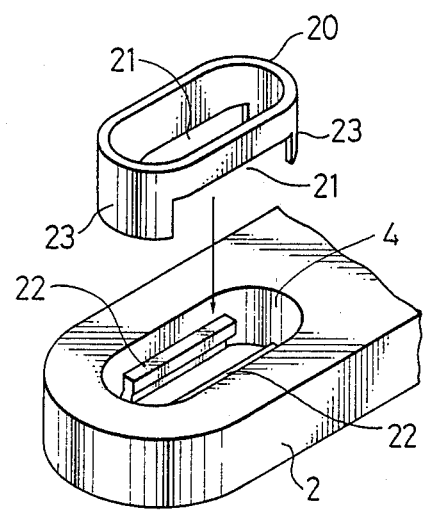
FIG. 7 is an exploded perspective view of the structure shown in FIGS. 5 and 6.

FIGS. 5 through 7 show a second embodiment of the present invention which is applied to each of the elongated holes 4 shown in FIG. 1.

Similarly to the embodiment shown in FIG. 3(b), in FIGS. 5 to 7, since the length of the sleeve 20 is also shorter than the length of the hole 4, a gap is created above the upper longitudinal end of the sleeve when the sleeve 20 is properly secured into the hole 4. Thus, a part of the inner surface of the hole in the resin member can be deformed over the longitudinal end of the sleeve, preventing a metal-to-metal contact between the bolt and the sleeve, similar to the embodiment of FIG. 3(b).

This embodiment includes a feature which is suited for temporarily holding a threaded bolt 6 in the hole 4. The metallic sleeve 20 to be fitted into the hole 4 is elongated in shape so as to correspond to the shape of the hole 4. The metallic sleeve 20 is additionally provided with a notch 21 in the lower end of either long side thereof so as to receive therein projections 22 integrally formed in the inner circumferential surface of the hole 4, thereby defining a pair of legs 23 on either short side of the metallic sleeve 20. The space between the projections 22 is set such that the bolt 6 is supported therebetween.

Therefore, when a threaded bolt 6 is passed through the metallic sleeve 20, the threaded part of the threaded volt 6 is engaged between the projections 22 and is temporarily secured therebetween. This engagement may be easily broken if the threaded bolt 6 is pulled out or pushed further into the hole 4 by threading with a nut 8. The legs 23 apply elastic pressure to the inner wall of the hole 4 to increase the capability to secure the metallic sleeve 20 in the hole 4 without increasing the force required for press fitting the sleeve 20 into the hole 4.

Figure 8:
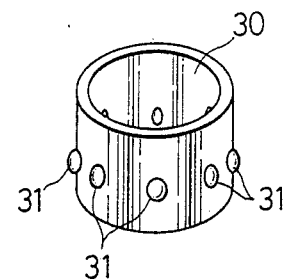
FIGS. 8 through 10 show other embodiments of the metallic sleeve according to the present invention.

In the embodiment shown in FIG. 8, the outer circumferential surface of the metallic sleeve 30 is provided with a plurality of projections 31 made by embossing along its circumference, in a longitudinally middle part thereof. These projections 31 produce substantially the same effect as the ribs 9b of the first embodiment.

Figure 9:
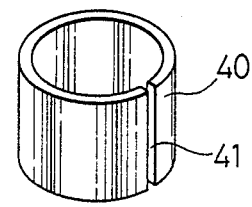

The sleeve 40 illustrated in FIG. 9 has a smooth outer circumferential surface but is provided with a longitudinal slit 41 extending the entire length of the sleeve 40. Because of the presence of the slit 41, the sleeve 40 can be elastically compressed as it is fitted into a hole, and substantially the same effect as that of the elastic legs 23 of the second embodiment may be produced.

Figure 10:
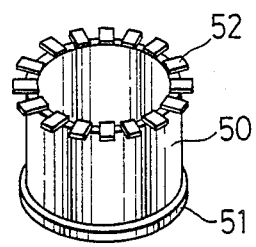

The sleeve 50 shown in FIG. 10 is provided with a small radial flange 51 at its one longitudinal end, and a plurality of radially extending tangs 52 at its other end.

Thus constituted sleeve 50 is inserted into the mounting hole 3 or 4 and placed to a position where a gap is provided above the longitudinal end of the sleeve. In this condition, not only are the tangs 52 elastically abutted against the inner circumferential surface of the hole 3 or 4, but also the radial flange 51 is tightly fitted inside the hole, whereby the sleeve 50 is secured in the hole.

According to this embodiment, similarly to the embodiment of FIG. 3(b) and FIGS. 5-7, when the threaded bolt 6 is fastened and a tightening force is applied to the resin member, the tightening force is restricted by the sleeve 50, so that secure fastening of the bolt 6 without damaging the tab 2 can be accomplished substantially in the same way as the above-described embodiments. Further, when excessive tightening force is applied to the resin member, the upper portion of the resin member around the hole collapses to be deformed by the tightening force and then a part of the deformed resin member will fill the gap above the longitudinal end of sleeve 50, thereby preventing a metal-to-metal contact between the threaded bolt and the sleeve 50.

As a person skilled in the art can readily understand, the shape of the metallic sleeve can be modified in various ways without departing from the spirit of the present invention.

What we claim is:

1. A structure for fastening a resin member having a hole with a certain length to another member having a hole with a threaded bolt which is passed through the holes provided in the members, comprising:
   a metallic sleeve through which the bolt is to be passed, said metallic sleeve having a longitudinal end being fitted into said hole provided in said resin member for preventing damage from being caused in the resin member by an excessive tightening force of the bolt; and
   the length of said sleeve being slightly shorter than the length of said hole of said resin member such that a part of the resin member can be deformed over the longitudinal end of the sleeve when excessive tightening force is applied to the resin member whereby uncontrolled deformation of the resin member is avoided.

2. A structure according to claim 1, further comprising means for securing said sleeve in said hole of said resin member.

3. A structure according to claim 2, wherein the sleeve has an outer circumferential surface, and said securing means comprises a plurality of projections or ribs provided on the outer circumferential surface of said sleeve.

4. A structure according to claim 2, wherein the hole of the resin member has an inner circumferential surface, and said securing means comprises a plurality of tangs radially extending from a longitudinal end of said sleeve such that the tangs are elastically abutted against the inner circumferential surface.

5. A structure according to claim 2, wherein said securing means comprises a slit extending substantially along the entire longitudinal length of said sleeve for giving elasticity to the sleeve.

6. A structure according to claim 2, wherein said securing means comprises a pair of elastic legs provided in said sleeve.

7. A structure according to claim 2, wherein said securing means comprises two opposite notches formed in the sleeve and two projections formed on the inner circumferential surface of the hole of the resin member so as to engage with the notches, respectively.

8. A structure according to claim 7, wherein said two projections are arranged such that the bolt which will be passed through the sleeve is temporally supported between the projections.

9. A structure according to claim 1, wherein said resin member comprises a tab provided on a resin casing and said other member is a bracket.

10. A reinforcement device for use in a structure for fastening a resin member having a hole with a certain length to another member having a hole with a threaded bolt which is passed through the holes provided in the members, comprising:
    a metallic sleeve having a longitudinal end through which the bolt is to be passed, and the metallic sleeve being fitted into said hole provided in said resin member for preventing damage from being caused in the resin member by a tightening force of the bolt; and
    the length of said sleeve being slightly shorter than the length of said hole of said resin member such that a part of the resin member can be deformed over the longitudinal end of the sleeve when excessive tightening force of the bolt is applied to the resin member.

* * * * *